(12) United States Patent
Spoon (10) Patent No.: US 9,823,912 B2
(45) Date of Patent: Nov. 21, 2017

(54) DATA FLOW ANALYSIS WITH COLLAPSED CONTEXTS

(71) Applicant: SEMMLE LIMITED, Oxford (GB)

(72) Inventor: Alexander Spoon, Atlanta, GA (US)

(73) Assignee: Semmle Limited, Oxford (GB)

( * ) Notice: Subject to any disclaimer, the term of this patent is extended or adjusted under 35 U.S.C. 154(b) by 91 days.

(21) Appl. No.: 14/884,590

(22) Filed: Oct. 15, 2015

(65) Prior Publication Data

US 2017/0109144 A1    Apr. 20, 2017

(51) Int. Cl.
*G06F 9/45*     (2006.01)
*G06F 11/36*    (2006.01)
*G06F 21/57*    (2013.01)

(52) U.S. Cl.
CPC .......... *G06F 8/433* (2013.01); *G06F 11/3604* (2013.01); *G06F 21/577* (2013.01)

(58) Field of Classification Search
CPC .... G06F 21/562; G06F 21/563; G06F 21/577; G06F 2221/033; G06F 11/3604; G06F 8/43; G06F 8/433
See application file for complete search history.

(56) References Cited

U.S. PATENT DOCUMENTS

| | | | | |
|---|---|---|---|---|
| 6,370,685 B1 * | 4/2002 | Robison | ................... | G06F 8/433 717/141 |
| 8,429,633 B2 * | 4/2013 | Title | ........................ | G06F 21/51 717/132 |
| 8,434,064 B2 * | 4/2013 | Akritidis | ............. | G06F 11/3612 717/100 |
| 8,615,804 B2 * | 12/2013 | Mui | ........................ | G06F 21/56 717/154 |

(Continued)

OTHER PUBLICATIONS

Arzt, S., et al., FlowDroid: precise context, flow, field, object-sensitive and lifecycle-aware taint analysis for Android apps, Proceedings of the 35th ACM SIGPLAN Conference on Programming Language Design and Implementation, 2014, pp. 259-269, [retrieved on Feb. 10, 2017], Retrieved from the Internet: <URL:http://dl.acm.org/>.*

(Continued)

*Primary Examiner* — Geoffrey St Leger
(74) *Attorney, Agent, or Firm* — Fish & Richardson P.C.

(57) ABSTRACT

Methods, systems, and apparatus, including computer programs encoded on computer storage media, for performing data flow analysis using collapsed contexts. One of the methods includes obtaining data representing a plurality of software elements, wherein one or more software elements are initially designated as elements having the particular property; iteratively designating other software elements to which data of the one or more elements having the particular property flows, including: whenever the program includes multiple calls to a function, analyzing the function in a collapsed context to determine whether any argument flows to a return value of the function, and whenever any data in an argument that has the particular property according to the collapsed context flows to a return value of the function, adding each call to the function throughout the program having one argument having the particular property; and providing the set of software elements having the particular property.

18 Claims, 3 Drawing Sheets

(56) References Cited

U.S. PATENT DOCUMENTS

| | | | | |
|---|---|---|---|---|
| 8,756,587 | B2* | 6/2014 | Pistoia | G06F 8/43 717/128 |
| 8,769,516 | B2* | 7/2014 | Dhoolia | G06F 11/3604 714/25 |
| 8,856,764 | B2* | 10/2014 | Pistoia | G06F 11/3604 717/152 |
| 8,949,811 | B2* | 2/2015 | Murthy | G06F 8/315 717/157 |
| 9,639,703 | B2* | 5/2017 | Liu | G06F 21/577 |
| 2008/0072214 | A1 | 3/2008 | Peyton et al. | |
| 2013/0055208 | A1* | 2/2013 | Murthy | G06F 8/433 717/126 |
| 2014/0047538 | A1* | 2/2014 | Scott | G06F 11/3604 726/22 |
| 2014/0130153 | A1 | 5/2014 | Dolby et al. | |
| 2014/0130154 | A1* | 5/2014 | Dolby | G06F 21/577 726/22 |
| 2015/0067660 | A1 | 3/2015 | Pistoia et al. | |
| 2016/0110549 | A1* | 4/2016 | Schmitt | G06F 21/577 726/25 |
| 2017/0132419 | A1* | 5/2017 | Gupta | G06F 11/3604 |

OTHER PUBLICATIONS

Baca, D., Identifying Security Relevant Warnings from Static Code Analysis Tools through Code Tainting, 2010 International Conference on Availability, Reliability and Security, pp. 386-390, [retrieved on Feb. 11, 2017], Retrieved from the Internet: <URL:http://ieeexplore.ieee.org/>.*

Huang, J., et al., Vulnerabilities Static Detection for Web Applications with False Positive Suppression, 2010 IEEE International Conference on Information Theory and Information Security (ICITIS), pp. 574-577, [retrieved on Feb. 11, 2017], Retrieved from the Internet: <URL:http://ieeexplore.ieee.org/>.*

Balliu et al., "Automating Information Flow Analysis of Low Level Code," Proceedings of the 2014 ACM SIGSAC Conference on Computer and Communications Security, 2014, 12 pages.

Burket et al., "Making DidFail Succeed: Enhancing the CERT Static Taint Analyzer for Android App Sets," Technical Report No. CMU/SEI-2015-TR-001, Software Engineering Institute, Carnegie Mellon University, 2015, 29 pages.

Denaro et al., "Dynamic Data Flow Testing of Object Oriented Systems," Proceedings of the $37^{th}$ Annual Conference on Software Engineering, vol. 1, 2015, 12 pages.

Lickly, "Static Model Analysis with Lattice-based Ontologies," Technical Report No. UCB/EECS-2012-212, Electrical Engineering and Computer Sciences, University of Berkeley, Nov. 2012, 101 pages.

Rimsa et al., "Tainted Flow Analysis on e-SSA-form Programs," Proceedings of the $20^{th}$ International Conference on Compiler Construction, published in *Compiler Construction*, 2011, 20 pages.

Sridharan et al., "Correlation Tracking for Points-To Analysis of JavaScript," Proceedings of the 26th European conference on Object-Oriented Programming, 2012, 25 pages.

European Extended Search Report for Application No. 16193631.5, dated Mar. 16, 2017, 8 pages.

\* cited by examiner

DATA FLOW ANALYSIS WITH COLLAPSED CONTEXTS

BACKGROUND

This specification relates to data flow analysis.

Data flow analysis derives information about how values are bound to variables of a program by examining static code of the program. To derive this information, a data flow analysis system determines between which software elements data in a program can flow. This information may be represented as a data flow graph.

A common use of data flow analysis is to mark some software elements of the program as tainted. In some cases, the tainted software elements of the program are those that can hold a value supplied by an external user, which are potential security weaknesses. For example, the user can perform an injection attack by providing the software program with a malicious Structured Query Language (SQL) query. If this "tainted" query is executed without first being cleansed, the database may be compromised, for example by dropping tables or providing confidential information to the user.

Some data flow analysis approaches do not consider calling contexts. A calling context represents some aspect of an individual call to a function, such as the tainted or untainted status of arguments to a function. If not using calling contexts, the data flow analysis can result in many false positives because if a return value of the function can ever receive tainted data, a system may consider every call to the function to be tainted.

False positives can be reduced by using Cartesian Product calling contexts, in which the function is separately analyzed for each distinct combination of tainted or untainted arguments to the function. However, considering each combination separately results in an exponential complexity for performing data flow analysis.

SUMMARY

This specification describes a system for analyzing data flow with collapsed contexts. In general, a "calling context," or context for short, specifies a status of arguments to a function when the function is called, e.g., whether the arguments have a tainted or untainted status. Many examples in this specification will refer to arguments being tainted or untainted in the context of taint analysis. However, the same techniques can also be applied to other domains that do not involve taint analysis.

The default context for taint analysis represents the function being called with no tainted arguments. A collapsed context for taint analysis represents a call to the function with at least one tainted argument. In other words, if an argument was ever seen as tainted, the argument is considered tainted in the collapsed context. Each function is analyzed at most twice: once in the default context, and once in the collapsed context if the function is ever called with any tainted arguments.

Particular embodiments of the subject matter described in this specification can be implemented so as to realize one or more of the following advantages. Determining taintedness using a data flow analysis system with collapsed contexts results in a dramatic decrease in false positives relative to using no contexts and results in a dramatic reduction in computational time and space relative to using Cartesian Product contexts. Unlike Cartesian Product contexts, collapsed contexts can typically be viable for a general-purpose analysis of arbitrary real-world code bases. Analyzing functions having n arguments requires, instead of $2^n$ complexity in the case of Cartesian Product contexts, only constant complexity. In other words, analyzing a function using collapsed contexts requires computing data flow of each tainted argument through the function at most once.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a data flow analysis system that uses collapsed contexts in order to analyze the flow of data to software elements in a software program.

The term "software element" refers broadly to any discrete part of the software program. A software element may be a source code element, e.g., a variable, function, class, or type. The definition of what software elements exist in a project is flexible. The software elements that are defined to exist in a project can thus vary according to different programming languages, different build systems, and different user-supplied definitions of software elements. In some implementations, the data flow analysis system performs analysis on a limited set of software elements, e.g., only variables and function calls, based on a user configuration.

In general when performing data flow analysis with collapsed contexts, the system considers a function to have been called in either a default context, in which no arguments to the function have a particular property, or in a collapsed context. A collapsed context is collapsed in the sense that multiple different calling contexts having different combinations of arguments having the particular property or not are collapsed into a single context. The collapsed context represents the least upper bound, in a particular lattice domain, of the statuses of arguments to the function. The collapsed context can change over the course of the analysis as additional arguments are encountered, but at any one time a function has at most two contexts: a collapsed context and a default context.

In the case of taint analysis, the lattice domain has only two states, tainted and untainted. The least upper bound in this domain thus represents each argument to a function as tainted if the function has ever been called with the argument being tainted and represents the argument as untainted otherwise. However, the least upper bound for a collapsed context can equivalently be computed for other domains. For example, the lattice domain can represent natural numbers if the system were computing the number of distinct paths along which data of tainted arguments could flow. In that example, the least upper bound for the collapsed context would be the upper bound of distinct paths for each argument.

Other properties of arguments that a system can examine during data flow analysis include (i) extreme numeric values, e.g., a maximum value of an integer datatype, (ii)

insecure uniform resource locators (URLs), e.g., "http" URLs instead of "https" URLs, (iii) data that was encrypted using insecure cryptographic algorithms, e.g., "DES", and (iv) arguments that have sensitive user data, to name just a few examples.

When performing taint analysis with collapsed contexts, the system considers a function to have been called either in a default context, in which no arguments to the function are considered to be tainted, or in a collapsed context in which arguments that have been encountered as tainted anywhere in the program are considered to be tainted and other arguments are considered to be untainted.

An example software program that illustrates collapsed contexts for taint analysis is illustrated in Table 1.

TABLE 1

| 1  | concat( x, y, z ) { |
| --- | --- |
| 2  | return x++y++z |
| 3  | } |
| 4  |  |
| 5  | function1( ) { |
| 6  | let s = concat( readQueryFromUser( ), readQueryFromConfig1( ), ";") |
| 7  | executeQuery( s ) |
| 8  | } |
| 9  |  |
| 10 | function2( ) { |
| 11 | let t = concat( readQueryFromConfig1( ), readQueryFromConfig2( ), ";") |
| 12 | executeQuery( t ) |
| 13 | } |
| 14 |  |
| 15 | function3( ) { |
| 16 | let u = concat( readQueryFromConfig1( ), readQueryFromUser( ), ";") |
| 17 | executeQuery( u ) |
| 18 | } |

After the data flow analysis system performs data flow analysis on the software program, the system will have a set of tainted software elements that includes the software elements s and u. The method readQueryFromUser( ) is initially designated as tainted because it enables a user to provide a destructive command in the form of a query. Thus, variables s and u, to which data from readQueryFromUser( ) flows, are tainted as a result of data flow analysis, which will be described with reference to FIGS. 1 and 2A-B.

The software elements read QueryFromConfig1( ) and read QueryFromConfig2( ) on line 11 are not considered to be tainted because the method call does not enable a user to provide any input to the software program. Rather, readQueryFromConfig1( ) and readQueryFromConfig2( ) only enable reading a query from a configuration file. Thus, the variable t, to which data from readQueryFromConfig1( ) and readQueryFromConfig2( ) flows, is not considered to be tainted.

Figure 1:
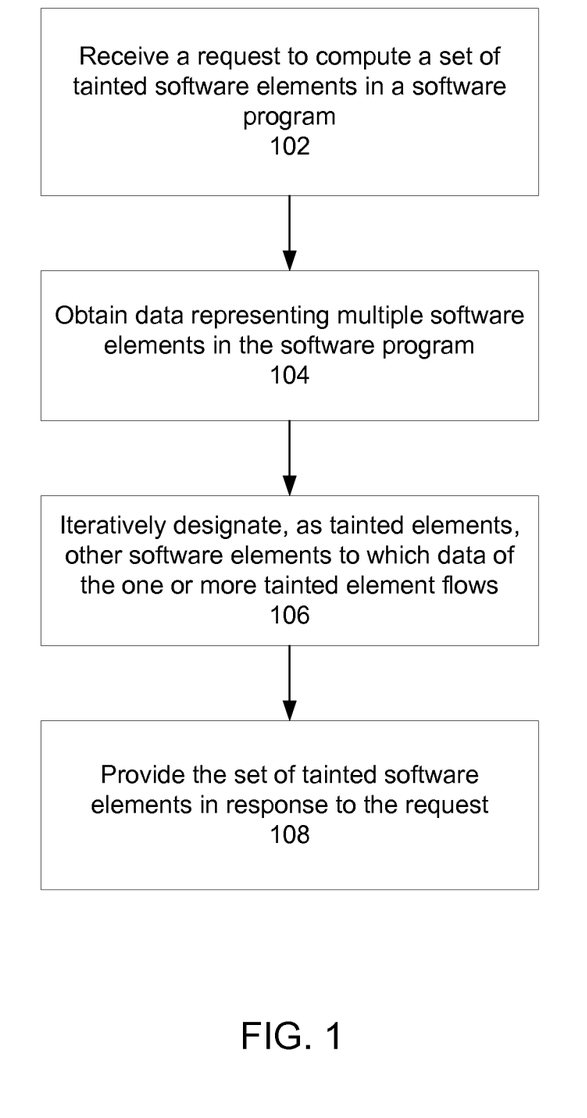
FIG. 1 is a flow diagram of an example method for analyzing data flow with collapsed contexts.

FIG. 1 is a flow diagram of an example method for analyzing data flow of tainted data with collapsed contexts. For convenience, the method will be described with respect to a data flow analysis system having one or more computing devices that execute software to implement the method.

The system receives a request to compute a set of tainted software elements in a software program (step 102). The request can be sent from a user operating a computer that is executing the data flow analysis system.

The system obtains data representing multiple software elements in the software program (step 104). The system initially designates one or more software elements as tainted elements. For example, referring to the software program of Table 1, the system can initially designate readQueryFromUser( ) as tainted because readQueryFromUser( ) is a potential source of tainted data obtained from user input. The system can initially designate some software elements as tainted if they meet certain criteria for potentially being the origin of tainted data or according to a designation by an administrator of the system.

The system iteratively designates, as tainted elements, other software elements to which data of the one or more tainted elements flows (step 106). In general, the system maintains a set of tainted software elements, starting from the elements that are initially designated as tainted. Then, on each iteration, the system determines to which other software elements data of the tainted software elements flows.

In some implementations, the system uses fixed point evaluation semantics by defining predicates that specify how data in a program can flow. The system then uses the predicates to evaluate from the initially designated elements until a fixed point is reached, representing a point at which the tainted data stops flowing.

When using collapsed contexts, each function has one of two possible contexts (1) a default context in which every argument to the function is considered untainted, and (2) a collapsed context in which each argument is considered tainted if the argument is tainted anywhere in the program and untainted otherwise. In other words, the collapsed context represents a least upper bound of respective tainted statuses of all arguments to the function across all instances of calls to the function in the program. A function call is analyzed in the default context, in which it is assumed that none of its arguments are tainted. A function call is analyzed in the collapsed context if at least one of its arguments is found to be tainted.

Thus, the system needs only a single bit to represent whether a function is being analyzed in the default context or in the function's collapsed context. In the following example, the occurrence of each element is represented by a tuple that contains (1) the class that the element is contained in, (2) the function that the element is contained in, (3) the context of the function (i.e., item 2 of the tuple), and (4) the element itself.

In this example, the default context is represented by the value "false," and the collapsed context is represented by the value "true." In the collapsed context, an argument to the function is considered tainted if that argument was seen as tainted anywhere in the program.

Pass 1:
Current Tainted Elements:
(none)
New Tainted Elements:
(Main, function1, false, readQueryFromUser( ))
(Main, function3, false, readQueryFromUser( ))
On the first pass, the only currently tainted elements are those that were initially designated as tainted.

Pass 2:
Current Tainted Elements:
(Main, function1, false, readQueryFromUser( ))
(Main, function3, false, readQueryFromUser( ))
New Tainted Elements:
(Main, concat, true, x)
(Main, concat, true, y)
On the second pass, the system determines to which other data elements the data of each instance of readQueryFromUser( ) can flow. In this example, the data can flow to two of the arguments to concat( ), which are x on line 6, and y on line 16. Note that arguments x and y of concat have both been marked as tainted in the collapsed context, indicated by the third element of their respective tuples being "true." This means that, at least at this point in the analysis, the argument z is considered untainted, even in the collapsed context. When performing data flow analysis with collapsed contexts, the collapsed context can change over the course of the analysis as additional tainted arguments are encountered. For example, if x is first encountered as being tainted, the system will analyze concat in a collapsed context in which only x is tainted but y is not. After encountering the tainted y element, the collapsed context of concat would change to one in which both x and y are considered to be tainted. In this way, the least upper bound of the function arguments is discovered as the data flow analysis progresses.

Pass 3:
Current Tainted Elements:
(Main, function1, false, readQueryFromUser( ))
(Main, function3, false, readQueryFromUser( ))
(Main, concat, true, x)
(Main, concat, true, y)
New Tainted Elements:
(Main, concat, true, x++y++z)

On the third pass, the system determines to which other data elements the data of x and y can flow. To do so, the system will analyze the function concat. Because at least one of the arguments to concat is tainted, the system will analyze the data flow of x and y through concat in the collapsed context.

When analyzing the data flow of x and y through concat in the collapsed context, x and y are both considered to be tainted in the same call to concat because they both have been encountered as tainted somewhere in the program. This is true even though the program never called concat with x and y both being tainted at the same time.

Using the collapsed context thus allows the system to analyze the data flow of each tainted argument to concat exactly once in the collapsed context. In other words, even though the program contained multiple calls to concat, each having different combinations of tainted arguments, the system can analyze the data flow of each tainted argument to concat in the collapsed context only once.

In the collapsed context of concat, both x and y can flow to the return value of concat, x++y++z. Therefore, on pass 3 the system adds the return value of concat in the collapsed context to the set of tainted elements. Typically, the system analyzes the data flow of x and y through concat separately. If data of both x and y can flow to the return value, the system need not duplicate the return value of concat in the collapsed context in the set of tainted elements. Rather, both instances of the return value are represented by the single instance that indicates that the return value of concat in the collapsed context is considered to be a tainted software element.

The system may also add a separate instance of the return value of concat in the default context, e.g., when tainted data that originates in concat flows to the return value. Thus, the return value for all possible calling contexts of concat are represented by at most two instances of the return value: one in the collapsed context, and one in the default context.

Pass 4:
Current Tainted Elements:
(Main, function1, false, readQueryFromUser( ))
(Main, function3, false, readQueryFromUser( ))
(Main, concat, true, x)
(Main, concat, true, y)
(Main, concat, true, x++y++z)
New Tainted Elements:
(Main, function1, false, concat( . . . ))
(Main, function3, false, concat( . . . ))

On the fourth pass, the system determines to what other software elements the return value of concat can flow. Note that because the call to concat( . . . ) in function2 occurred in the default context (i.e., none of the arguments to concat were tainted) rather than the collapsed context (i.e., at least one of the arguments to concat was tainted), that call to concat has not been marked as tainted.

The tainted return value of concat flows to the calls to concat in function1 and function3 respectively. The contexts for the corresponding tuples are false because the calls to function1 and function3 do not contain tainted arguments. Thus, the system adds the calls to concat within function1 and function3 to the set of tainted software elements. In this notation, the ellipses ( . . . ) represents the arguments to concat.

Pass 5:
Current Tainted Elements:
(Main, function1, false, readQueryFromUser( ))
(Main, function3, false, readQueryFromUser( ))
(Main, concat, true, x)
(Main, concat, true, y)
(Main, concat, true, x++y++z)
(Main, function1, false, concat( . . . ))
(Main, function3, false, concat( . . . ))
New Tainted Elements:
(Main, function1, false, s)
(Main, function3, false, u)

On the fifth pass, the system determines to what other software elements the calls to concat in function1 and function3 can flow. In this example, the calls to concat flow to s and u respectively.

After the fifth pass, the tainted data can flow to no more software elements, thus the process ends.

In the example from Table 1, both x and y flowed to the same return value. However, this need not be the case. Table 2 illustrates another example using taint analysis:

TABLE 2

| | |
|---|---|
| 1 | foo( x, y, z ) { |
| 2 | if ( x ) |
| 3 | return y |
| 4 | else |
| 5 | return z |
| 6 | } |
| 7 | |
| 8 | function1( ) { |
| 9 | let s = foo( readQueryFromUser( ), readQueryFromConfig1( ), ";") |
| 10 | executeQuery( s ) |
| 11 | } |
| 12 | |
| 13 | function2( ) { |
| 14 | let t = foo( readQueryFromConfig1( ), readQueryFromConfig2( ), ";") |
| 15 | executeQuery( t ) |
| 16 | } |
| 17 | |
| 18 | function3( ) { |
| 19 | let u = foo( readQueryFromConfig1( ), readQueryFromUser( ), ";") |
| 20 | executeQuery( u ) |
| 21 | } |

This example is identical to the example shown in Table 1, except that concat has been replaced with a different function, foo(x,y,z).

In this example, the argument x has no way of flowing out of foo. Therefore, if x is the only tainted argument that foo is ever called with, the system will not consider the return value of foo to be tainted.

However, as shown on line 19, the argument y is tainted because it takes a value from the initially designated element readQueryFromUser( ). Therefore, the tainted value of y can flow to the return value of foo.

Pass 3 of the data flow analysis is similar to Pass 3 above:

Pass 3:

Current Tainted Elements:

(Main, function1, false, readQueryFromUser( ))
(Main, function3, false, readQueryFromUser( ))
(Main, foo, true, x)
(Main, foo, true, y)

New Tainted Elements:

(Main, foo, true, return y)

When considering the element (Main, foo, true, x), the system will analyze foo( ) in the collapsed context. In the collapsed context, x and y will both be considered tainted in the same call to foo because both x and y have both been encountered as tainted somewhere in the program.

Thus, when the system analyzes foo for the element x, the element y is also considered to be tainted. The tainted value of y can flow to the return value of the function foo, and thus, the system adds the return value foo as a tainted element.

Also, after considering the element (Main, foo, true, x), the system determines the taintedness of x does not flow out of foo. Thus, the software element (Main, function1, false, foo( . . . )) is not added to the set of tainted elements.

However, when the system considers the element (Main, foo, true, y), the system determines that the tainted data from the element y can flow out of foo. Then, the system marks all calls to foo in the collapsed context as tainted, i.e., (Main, function1, false, foo( . . . )) and (Main, function3, false, foo( . . . )).

The system provides the set of tainted software elements in response to the request (step 108). In some implementations, the system provides the set of tainted software elements to a user interface accessible by the user sending the request.

Figure 2A:
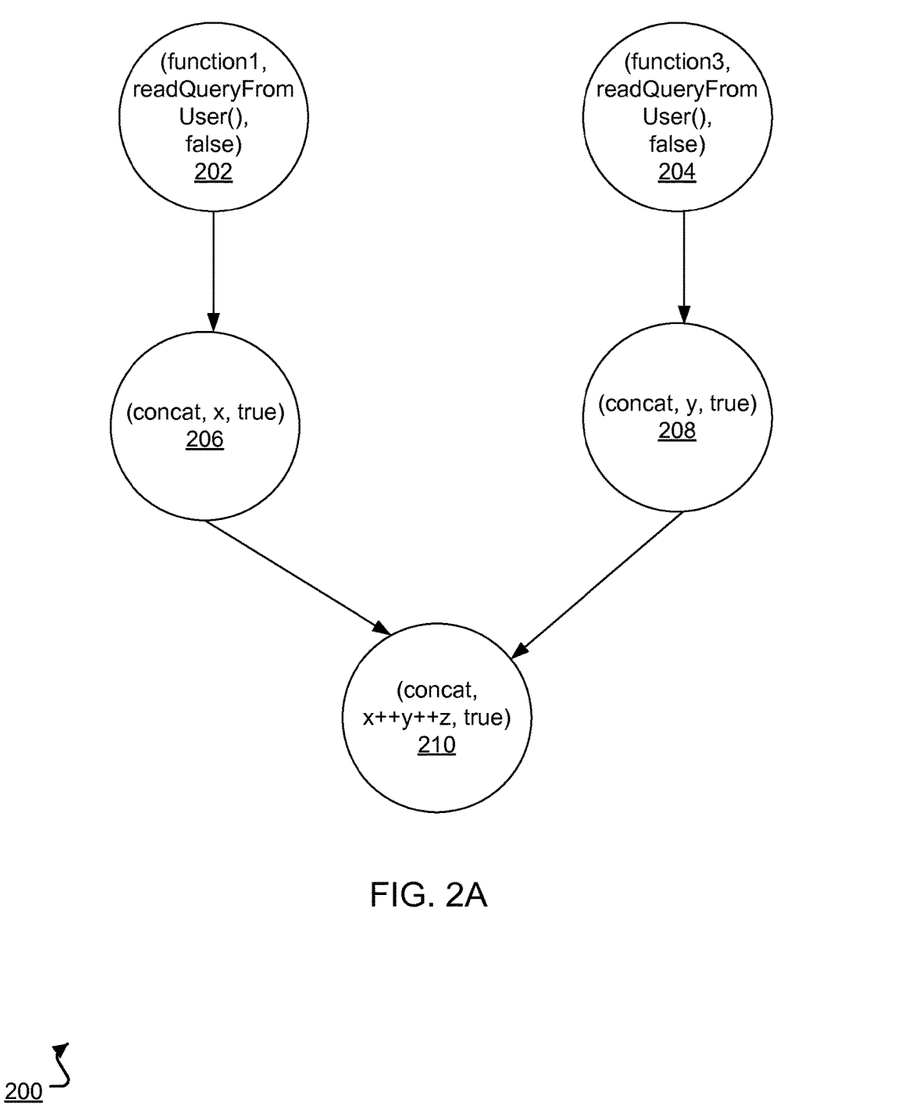
FIGS. 2A-B are diagrams of an example data flow graph through which taintedness flows.

FIG. 2A is a diagram of a subset 200 of a data flow graph for the software program in Table 1. In some implementations, the system can represent the flow of tainted data in the program using a data flow graph. A data flow graph has nodes representing software elements and directed edges between nodes, where a directed edge represents that data flows from one software element to another.

In FIG. 2A, the data flow graph includes nodes 202-210, which represent software elements to which tainted data flows. Nodes of other untainted software elements from the example in Table 1 are not displayed, e.g., nodes corresponding to the t variable or the readQueryFromConfig1( ) method are not shown.

A data flow analysis system, e.g., the system of FIG. 1, can generate the data flow graph to calculate a set of tainted software elements in the software program.

Each node is associated with a tuple representing a software element. For brevity, the tuples in this example omit the class involved and only specify the function name, the software element, and a value for the context, with true representing the collapsed context and false representing the default context. For example, readQueryFromUser( ) is called within both function1 and function3, which calls are represented respectively by nodes 202 and 204.

The system can start from the two nodes 202 and 204 representing the software elements initially designated as tainted. The system can then identify a next software element to which data flows from the currently tainted software elements. For each newly tainted software element, the system can generate a subsequent node in the data flow graph.

Each node is associated with a context, either the default context or the collapsed context. A node that is associated with a collapsed context represents the corresponding element occurring in a function having at least one tainted argument. The collapsed context itself represents that each argument to a function called in the collapsed context is considered to be tainted if the argument is tainted anywhere in the program.

The system starts the data flow analysis with nodes 202 and 204 representing the software elements initially designated as tainted. The software elements corresponding to nodes 202 and 204 can be designated as tainted by a user or an administrator, as described above with reference to FIG. 1. The system can also determine that the contexts for node 202 and node 204 are false because function1 and function3, respectively, are never called with any tainted elements. The system can add the software elements corresponding to nodes 202 and 204 to a set of tainted elements.

The system determines to which elements data of the elements represented by nodes 202 and 204 flows. The system then generates corresponding nodes 206 and 208 representing the arguments in the concat function in line 1 of Table 1. The arguments each receive the tainted data from software element readQueryFromUser( ). In particular, line 6 of Table 1 shows the tainted software element readQueryFromUser( ) as an x argument to the concat function, and line 16 shows the tainted software element readQueryFromUser( ) as a y argument to the concat function.

On a next iteration, the system determines to which elements data of the elements represented by nodes 206 and 208 flows. Both of these elements are arguments to concat.

Because each call to the concat function has at least one tainted argument, e.g., at lines 6 and 16, the system analyzes the data flow of x and y through concat in the collapsed context in which both x and y are considered to be tainted in the same call.

Because the software element x++y++z uses the tainted data from x, the software element x++y++z is therefore considered to be tainted. Thus, the system then adds the software element x++y++z, representing the return value of concat, to the set of tainted elements. The system can then generate a node 210 representing the tainted return value of concat.

The system will also determine that tainted data from the element y can flow to the return value of concat. The return value of concat already exists in the set of tainted software elements, and likewise, a node 210 already exists to represent the return value of concat. Thus, the system need not add another instance of the return value of concat in the collapsed context to the set of tainted software elements, and similarly, in the graph the system can merely add a link from the node 208 to the node 210 rather than another node for the return value.

This will result in the system only analyzing a single instance of the return value of the function in the collapsed context to determine to which other software elements the data of the return value flows. That is, the system analyzes the return value x++y++z once even though concat is called multiple times with different types of tainted arguments. For example, concat is called once with x as a tainted argument and y and z as untainted arguments in line 6 and called again with y as a tainted argument and x and z as untainted arguments in line 16. When being called again with y as a tainted argument, the system determines that the return value has already been added to the set of tainted elements, and the system can bypass adding another instance of the return value to the set of tainted elements. And if generating a data flow graph, the system can bypass adding an additional node to the data flow graph representing the return value for the second function call with y as a tainted argument.

In other words, using collapsed contexts defines a particular type of set semantics. A set is considered to have a single instance of an element when the element occurs in a same context and if the element has a particular property for at least one reason. Therefore, if through the flow of data, the element is able to obtain the property for multiple reasons in the same context, the set still only includes a single instance of the element in that context. In this example, the return value for concat was able to obtain tainted data in multiple different ways in the same collapsed context. However, these situations are all represented by a single instance of the return value for concat in the collapsed context. The set of tainted elements may also include a second instance of the return value for concat, but one that represents the return value in the default context.

Figure 2B:
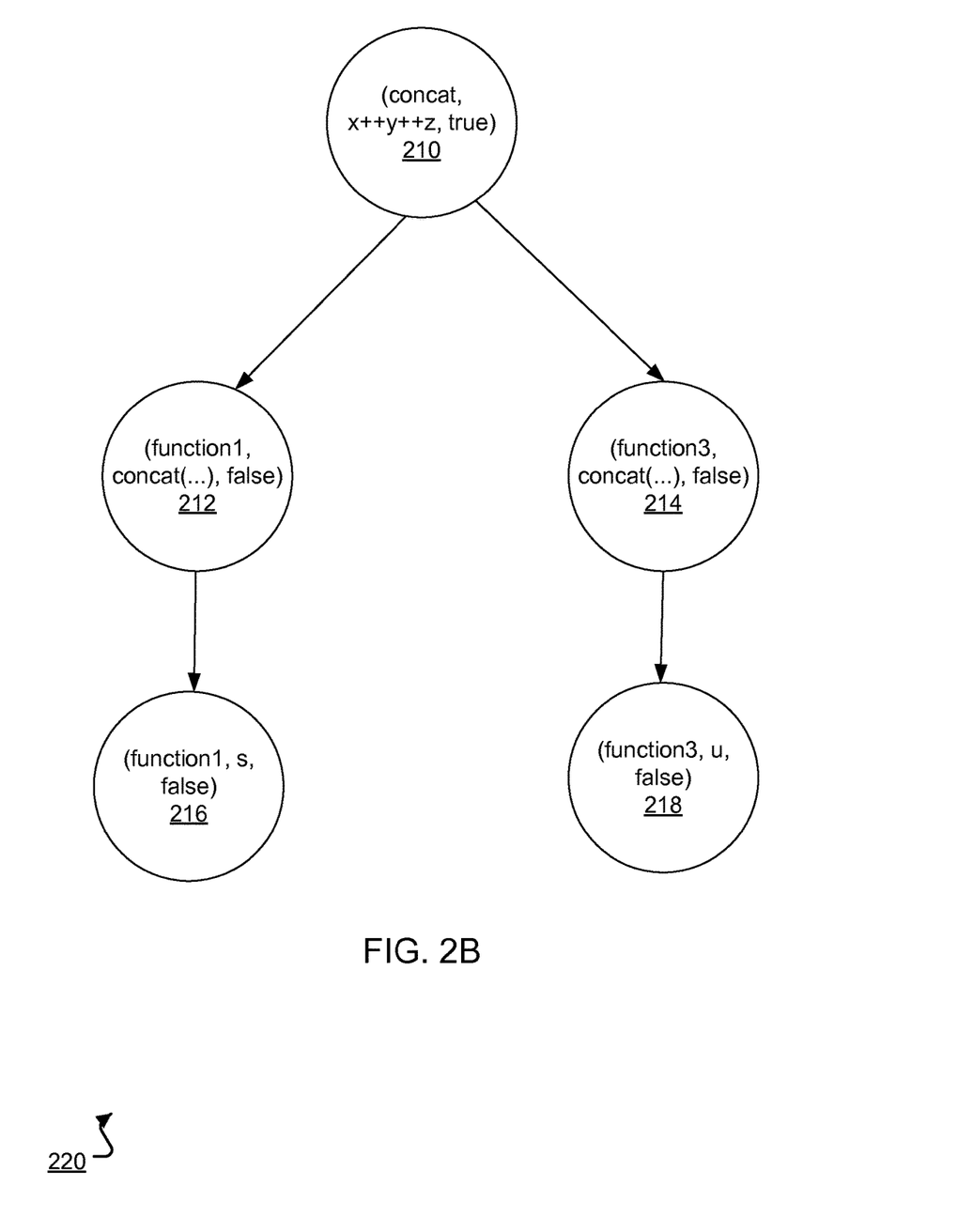

FIG. 2B is a diagram of another subset 220 of a data flow graph for the software program in Table 1. Continuing a data flow analysis from node 210, as described in FIG. 2A as having a true collapsed context, on a next iteration, the data analysis system determines to which software elements the return value of concat flows. The system thus generates nodes 212 and 214 corresponding to the concat method calls in lines 6 and 16, respectively.

On a next iteration, the system determines to which software elements the method calls to concat flow, and the system generates nodes 216 and 218 corresponding to software elements s and u at lines 6 and 16, respectively.

Finally, on a next iteration, the system reaches a fixed point at which the data flow analysis produces no more tainted nodes. At this point, the system completes the data flow analysis with collapsed contexts and provides the set of tainted elements to a user.

A detailed example of predicates that can be used to implement data flow analysis with collapsed contexts using fixed point semantics will now be described. The following example is a solution for analyzing Featherweight Java. Featherweight Java is described in more detail in Aisushi Igarashi et al., *Featherweight Java: A Minimal Core Calculus for Java and GJ*, ACM TOPLAS, Volume 23 Issue 3, May 2001, Pages 396-450.

Featherweight Java has the following minimal syntax:
L ::= class C extends C { C f . . . ; K M . . . }
K ::= C(C f . . . ) { super(f . . . ); this.f=f; . . . }
M ::= C m(C x . . . ) { return e;}
e ::= x|e.fle.m(e . . . )|new C(e . . . )|(C) e In other words, the only allowed expressions are variable names, field accesses, constructor calls, and casts. In particular, there is no arithmetic or assignment operators.

To implement collapsed contexts in Featherweight Java, the following auxiliary predicates can be defined. First, a predicate respondsTo(C, m) identifies the set of all methods that might respond to a method named m when called on an instance of class C. In other words, it either returns a method name m defined in class C or a method named m defined in the nearest superclass of C that has such a named method.

Next, a predicate localStep(C, m, e1, e2) designates that values flow from element e1 to element e2 without crossing a method call. The system can compute a result for this predicate by starting with an empty associated relation and updating the relation as follows:

If (C) x occurs in method C.m, then add localStep(C, m, x (C) x)

A predicate returnArg(C, m, i) designates that method C.m can return the value of its ith parameter without going through a field. Another predicate parameterReaches(C, m, i, e) designates that the value in the ith parameter of method C.m can flow to expression e. The system can compute associated relations for both predicates at the same time because they depend on one another.

If x occurs in method C.m, and x is the ith parameter of C.m, then then add parameterReaches(C, m, i, x).

If parameterReaches(C, m, i, e1), and localStep(C, m, e1, e2), then add parameterReaches(C, m, i, e2).

If parameterReaches(C, m, i, e), and return e is in method C.m, then add returnArg(C, m, i).

If parameterReaches(C, m, i, e1), and e3.4.*n*( . . . e1 . . . ) is in method C.m, with e1 being the jth parameter of the call and the type of e3 being D, and respondsTo(D, n)=E.n, and returnArg(E, n,j), then add parameterReaches (C, m, i, e3.*n*( . . . e1 . . . )).

After computing the associated relations for the auxiliary predicates, the system can use them to define a predicate dflow(C, m, e, nondef) that defines how tainted data flows within the program using collapsed contexts. In this example, the last argument "nondef" is either true or false, with true representing the collapsed, non-default context for the function m and false representing the default context in which all arguments are untainted. It is the nondef parameter that adds the collapsed contexts to the algorithm; instead of having one possible data flow value dflow(C, m, e) for each program element, there are two: dflow(C, m, e, false) and dflow(C, m, e, true).

The predicate dflow can then be repeatedly updated according to the following rules.
Rule 1:
If (C)e occurs in method C.m,
 and dflow(C, m, e, nondef)=d1,
 and dflow(C, m, (C)e, nondef)=d2,
 then set dflow(C, m, (C)e, nondef) :=lub(d1, d2)
The function lub returns the least upper bound of d1 and d2. In the case of taint analysis, the least upper bound is equivalent to the logical or of taintedness between d1 and d2.

The following example code illustrates Rule 1 being applied:

```
Before:
T3 foo(T1 x1) {
    return (T3) x1; // If x1 is marked as tainted...
}
After:
T3 foo(T1 x1) {
    return (T3) x1; // Taint flows to (T3) x1
}
```

Rule 2:
If e2.*n*( . . . e1 . . . ) occurs in C.m with e1 being the ith argument,
 and dflow(C, m, e1, nondef)=d1,
 and dflow(C, m, e2.*n*( . . . e1 . . . ), nondef)=d2,
 and the type of e1 is D,
 and E is a member of respondsTo(D, n),
 and returnArg(E, n, i),
 then set dflow(C, m, e2.*n*( . . . e1 . . . ), nondef) :=lub(d1, d2)
The following example code illustrates Rule 2 being applied:

```
Before:
T3 bar(T1 x1, T2 x2) {
    return (T3) x2;
}
T3 foo(T1 x1, T2 x2) {
    return this.bar(x1, x2);    // If x2 is marked as tainted and this.bar
                                // can
}                               // can return its second argument...
After:
T3 bar(T1 x1, T2 x2) {
    return (T3) x2;
}
T3 foo(T1 x1, T2 x2) {
    return this.bar(x1, x2);    // taint flows to the method call
}
```

Rule 3:
If e2.n( . . . e1 . . . ) occurs in C.m with e1 being the ith argument,
and dflow(C, m, e1, nondef)=d1,
and d1≠default,
and the type of e1 is D,
and E is a member of respondsTo(D, n),
and the ith parameter of E.n is x,
and dflow(E, n, x, true)=d2
then set dflow(E, n, x, true) :=lub(d1, d2)

Rule 3 illustrates how arguments are treated for functions that are called in collapsed contexts. In particular, if a function ever has an argument passed as tainted, in the collapsed context the function's argument will be considered as tainted.

The following example code illustrates Rule 3 being applied:

```
Before:
T3 bar(T1 x1, T2 x2) {
    return (T3) x2;
}
T3 foo(T1 x1, T2 x2) {
    return this.bar(x1, x2); // If x2 is marked tainted and passed to
bar...
}
After:
T3 bar(T1 x1, T2 x2) { // bar's x2 is marked tainted in non-
defaultcontexts
    return (T3) x2;
}
T3 foo(T1 x1, T2 x2) {
    return this.bar(x1, x2);
}
```

Rule 4:
If e1.n( . . . ) occurs in method C.m,
and the type of e1 is D,
and E is a member of respondsTo(D, n),
and return e2 is in E.n,
and dflow(E, n, e2, false)=d1,
and dflow(C, m, e1.n( . . . ), nondef)=d2,
then set dflow(C, m, e1.n( . . . ), nondef) :=lub(d1, d2)
The following code illustrates Rule 4 being applied:

```
Before:
T3 bar(T1 x1, T2 x2) {
    return taintedFunction(x1,x2); // If bar returns a newly tainted
value...
}
T3 foo(T1 x1, T2 x2) {
    return this.bar(x1, x2);
}
```

```
After:
T3 bar(T1 x1, T2 x2) {
    return taintedFunction(x1,x2);
}
T3 foo(T1 x1, T2 x2) {
    return this.bar(x1, x2); // The call to bar in foo is marked as
tainted
}
```

Rule 5:
If dflow(C, m, e1, nondef)≠default,
and e2.n( . . . e1 . . . ) occurs in method C.m with e1 being the ith argument,
and the type of e2 is D,
and E is a member of respondsTo(D, n),
and return e3 is in E.n,
and dflow(E, n, e3, true)=d1,
and dflow(C, m, e2.n( . . . e1 . . . ), nondef)=d2
then set dflow(C, m, e2.n( . . . e1 . . . ), nondef) :=lub(d1, d2)
The following code illustrates Rule 5 being applied:

```
Before:
T3 bar(T1 x1, T2 x2) {
    return someFunction(x1,x2);   // If someFunction is tainted for a
}                                 // non-default context...
T3 foo(T1 x1, T2 x2) {
    return this.bar(x1, x2);      // and x2 is marked as tainted...
}
After:
T3 bar(T1 x1, T2 x2) {
    return someFunction(x1,x2);
}
T3 foo(T1 x1, T2 x2) {
    return this.bar(x1, x2);      // then the call to this.bar is tainted
}
```

Rule 6:
If dflow(C, m, e1, nondef)=d1,
and new D( . . . e1 . . . ) is in method C.m,
and e1 is the ith parameter passed to new D( . . . e1 . . . ),
and f is the ith field of class D,
and e2.f occurs in any other method E.n,
and dflow(E, n, e2.f,nondef2)=d2
then set dflow(E, n, e2.f, nondef2) :=lub(d1, d2)
The following code illustrates Rule 6 being applied:

```
Before:
T3 foo(T1 x1, T2 x2) {
    return new T3(x1, x2); // If x2 is marked as tainted...
}
class T3 extends Object {
    T1 f1;
    T2 f2;
    T3(T1 x1, T2 f2) {          // and f2 is assigned the tainted value
        this.f1 = x1;           // in a constructor...
        this.f2 = x2;
    }
    T2 getF2( ) { return this.f2; }
}
After:
T3 foo(T1 x1, T2 x2) {
    return new T3(x1, x2);
}
class T3 extends Object {
    T1 f1;
    T2 f2;
    T3(T1 x1, T2 f2) {
        this.f1 = x1;
        this.f2 = x2;
    }
```

```
    T2 setF2( ) { return this.f2; }    // then all occurrences of T3.f2 in
                                           all
}                                      // methods are marked as tainted
```

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments of the attached embodiments and the embodiments described above, the following embodiments are also innovative:

Embodiment 1 is a method comprising:
receiving a request to compute a set of software elements having a particular property in a software program;
obtaining data representing a plurality of software elements in the software program, wherein one or more software elements in the program are initially designated as elements having the particular property;
iteratively designating, as elements having the particular property, other software elements to which data of the one or more elements having the particular property flows, including:
whenever the program includes multiple calls to a function having multiple arguments, each call to the function having at least one argument having the particular property, analyzing the function in a collapsed context to determine whether any argument that has the particular property according to the collapsed context flows to a return value of the function, wherein the collapsed context represents that any argument that has the particular property in any call to the function in the program is considered to have the particular property when analyzing the function, and
whenever any data in an argument that has the particular property according to the collapsed context flows to a return value of the function, adding, to the set of software elements having the particular property, each call to the function throughout the program having at least one argument having the particular property; and
providing the set of software elements having the particular property in response to the request.

Embodiment 2 is the method of embodiment 1, wherein the collapsed context represents calls to the function with at least one argument with the particular property.

Embodiment 3 is the method of embodiment 1, further comprising analyzing at most two instances of the return value to determine to which other software elements the data of the return value of the function flows, wherein the two instances include a single instance of the return value for the collapsed context.

Embodiment 4 is the method of embodiment 1, wherein the two instances includes a single instance of the return value for the default context.

Embodiment 5 is the method of embodiment 4, further comprising representing the instance of the return value of the function as a node in a data flow graph.

Embodiment 6 is the method of embodiment 5, wherein upon determining that a second tainted argument to the function flows to the return value for the function called in the collapsed context, bypassing adding an additional node to the data flow graph representing the return value for the function.

Embodiment 7 is the method of embodiment 1, wherein each argument in the collapsed context is considered to have the particular property if the argument has been encountered as having the particular property anywhere in the program.

Embodiment 8 is the method of embodiment 1, further comprising analyzing the data flow of each argument through the function at most once.

Embodiment 9 is the method of embodiment 1, wherein the status of the arguments having the particular property in the collapsed context does not correspond to the status of the arguments having the particular property in any specific function call in the program.

Embodiment 10 is the method of embodiment 1, wherein the software elements having the particular property are software elements that are considered to be tainted, software elements having a maximum numeric value, software elements having insecure uniform resource locators, software elements having insecurely encrypted data, or software elements having user sensitive data.

Embodiment 11 is a system comprising: one or more computers and one or more storage devices storing instructions that are operable, when executed by the one or more computers, to cause the one or more computers to perform the method of any one of embodiments 1-10.

Embodiment 12 is a computer storage medium encoded with a computer program, the program comprising instructions that are operable, when executed by data processing apparatus, to cause the data processing apparatus to perform the method of any one of embodiments 1-10.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

In addition to the embodiments of the attached embodiments and the embodiments described above, the following embodiments are also innovative:

What is claimed is:

1. A computer-implemented method comprising:
maintaining data identifying one or more initially tainted software elements in a set of software elements of a software program;
receiving a request to compute, from a set of software elements of the software program, a set of tainted software elements, wherein the tainted software elements are software elements to which data stored by one or more initially tainted software elements can flow in the software program, wherein the set of tainted software elements initially includes the one or more initially tainted software elements;

iteratively processing tainted software elements represented in the set of tainted software elements to determine to which other software elements data stored by the tainted software elements can flow, including analyzing each instance in the software program of a function call to a function to determine whether tainted data can flow to a return value of the function, wherein analyzing each instance of a function call to the function:

determining a context for the function call, wherein the context is either a default context or a collapsed context, wherein the function call is in the default context if and only if every argument to the function is not represented in the set of tainted software elements, and wherein the function call is in the collapsed context if and only if at least one argument to the function is represented in the set of tainted software elements;

whenever the function call is in the default context, analyzing the function in the default context to determine whether tainted data can originate within the function and flow to the return value of the function;

whenever the function call is in a collapsed context, determining whether a return value for the function in the collapsed context is represented in the set of tainted software elements;

whenever the return value for the function in the collapsed context is already represented in the set of tainted software elements, bypassing analyzing the function in the collapsed context;

whenever the return value for the function in the collapsed context is not represented in the set of tainted software elements, analyzing the function in the collapsed context including:

designating, as a tainted argument, any argument to the function that is designated as tainted according to the collapsed context, wherein an argument is designated as tainted according to the collapsed context if the argument has ever been tainted in any previously analyzed function call to the function,         determining whether data of any tainted argument according to the collapsed context can flow to a return value of the function, and         whenever data of a tainted argument according to the collapsed context can flow to a return value of the function, representing the return value of the function in the collapsed context as a new element in the set of tainted software elements,     thereby analyzing multiple calls to the function having multiple different combinations of tainted and untainted arguments only once in the collapsed context as a single function call having a single combination of tainted and untainted arguments represented by the collapsed context; and providing data representing the set of tainted software elements in response to the request.

2. The method of claim 1, further comprising:
analyzing a particular function call to the function in which a particular argument has tainted data;

determining that the particular argument is not tainted according to the collapsed context; and     in response, updating the collapsed context for the function to designate the particular argument as being tainted in the collapsed context.

3. The method of claim 1, further comprising representing an instance of the return value of the function in the collapsed context as a node in a data flow graph.

4. The method of claim 3, further comprising:
determining that data of multiple tainted arguments can flow to the return value for the function when the function call is analyzed in the collapsed context; and in response, bypassing adding an additional node to the data flow graph representing the return value for the function when the function call is in the collapsed context.

5. The method of claim 1, further comprising analyzing data flow of each argument through the function at most once.

6. The method of claim 1, wherein one or more arguments considered to be untainted for a particular function call are considered to be tainted when the function call is analyzed in the collapsed context.

7. A system comprising:
one or more computers and one or more storage devices storing instructions that are operable, when executed by the one or more computers, to cause the one or more computers to perform operations comprising:

maintaining data identifying one or more initially tainted software elements in a set of software elements of a software program;

receiving a request to compute, from a set of software elements of the software program, a set of tainted software elements, wherein the tainted software elements are software elements to which data stored by one or more initially tainted software elements can flow in the software program, wherein the set of tainted software elements initially includes the one or more initially tainted software elements;

iteratively processing tainted software elements represented in the set of tainted software elements to determine to which other software elements data stored by the tainted software elements can flow, including analyzing each instance in the software program of a function call to a function to determine whether tainted data can flow to a return value of the function, wherein analyzing each instance of a function call to the function comprises:

determining a context for the function call, wherein the context is either a default context or a collapsed context, wherein the function call is in the default context if and only if every argument to the function is not represented in the set of tainted software elements, and wherein the function call is in the collapsed context if and only if at least one argument to the function is represented in the set of tainted software elements;

whenever the function call is in the default context, analyzing the function in the default context to determine whether tainted data can originate within the function and flow to the return value of the function;

whenever the function call is in a collapsed context, determining whether a return value for the function in the collapsed context is represented in the set of tainted software elements;

whenever the return value for the function in the collapsed context is already represented in the set of tainted software elements, bypassing analyzing the function in the collapsed context;

whenever the return value for the function in the collapsed context is not represented in the set of tainted software elements, analyzing the function in the collapsed context including:

designating, as a tainted argument, any argument to the function that is designated as tainted according to the collapsed context, wherein an argument is designated as tainted according to the collapsed context if the argument has ever been tainted in any previously analyzed function call to the function, determining whether data of any tainted argument according to the collapsed context can flow to a return value of the function, and whenever data of a tainted argument according to the collapsed context can flow to a return value of the function, representing the return value of the function in the collapsed context as a new element in the set of tainted software elements, thereby analyzing multiple calls to the function having multiple different combinations of tainted and untainted arguments only once in the collapsed context as a single function call having a single combination of tainted and untainted arguments represented by the collapsed context; and providing data representing the set of tainted software elements in response to the request.

8. The system of claim 7, wherein the operations further comprise:

analyzing a particular function call to the function in which a particular argument has tainted data;

determining that the particular argument is not tainted according to the collapsed context and in response, updating the collapsed context for the function to designate the particular argument as being tainted in the collapsed context.

9. The system of claim 7, wherein the operations further comprise representing an instance of the return value of the function in the collapsed context as a node in a data flow graph.

10. The system of claim 9, wherein the operations further comprise:

determining that data of multiple tainted arguments can flow to the return value for the function when the function call is in the collapsed context; and in response, bypassing adding an additional node to the data flow graph representing the return value for the function when the function call is in the collapsed context.

11. The system of claim 7, wherein the operations further comprise analyzing data flow of each argument through the function at most once.

12. The system of claim 7, wherein one or more arguments considered to be untainted for a particular function call are considered to be tainted when the function call is analyzed in the collapsed context.

13. A computer program product, encoded on one or more non-transitory computer storage media, comprising instructions that when executed by one or more computers cause the one or more computers to perform operations comprising:

maintaining data identifying one or more initially tainted software elements in a set of software elements of a software program;

receiving a request to compute, from a set of software elements of the software program, a set of tainted software elements, wherein the tainted software elements are software elements to which data stored by one or more initially tainted software elements can flow in the software program, wherein the set of tainted software elements initially includes the one or more initially tainted software elements;

iteratively processing tainted software elements represented in the set of tainted software elements to determine to which other software elements data stored by the tainted software elements can flow, including analyzing each instance in the software program of a function call to a function to determine whether tainted data can flow to a return value of the function, wherein analyzing each instance of a function call to the function comprises:

determining a context for the function call, wherein the context is either a default context or a collapsed context, wherein the function call is in the default context if and only if every argument to the function is not represented in the set of tainted software elements, and wherein the function call is in the collapsed context if and only if at least one argument to the function is represented in the set of tainted software elements;

whenever the function call is in the default context, analyzing the function in the default context to determine whether tainted data can originate within the function and flow to the return value of the function;

whenever the function call is in a collapsed context, determining whether a return value for the function in the collapsed context is represented in the set of tainted software elements;

whenever the return value for the function in the collapsed context is already represented in the set of tainted software elements, bypassing analyzing the function in the collapsed context;

whenever the return value for the function in the collapsed context is not represented in the set of tainted software elements, analyzing the function in the collapsed context including:

designating, as a tainted argument, any argument to the function that is designated as tainted according to the collapsed context, wherein an argument is designated as tainted according to the collapsed context if the argument has ever been tainted in any previously analyzed function call to the function, determining whether data of any tainted argument according to the collapsed context can flow to a return value of the function, and whenever data of a tainted argument according to the collapsed context can flow to a return value of the function, representing the return value of the function in the collapsed context as a new element in the set of tainted software elements, thereby analyzing multiple calls to the function having multiple different combinations of tainted and untainted arguments only once in the collapsed context as a single function call having a single combination of tainted and untainted arguments represented by the collapsed context; and providing data representing the set of tainted software elements in response to the request.

14. The computer program product of claim 13, wherein the operations further comprise:
analyzing a particular function call to the function in which a particular argument has tainted data;
determining that the particular argument is not tainted according to the collapsed context and
in response, updating the collapsed context for the function to designate the particular argument as being tainted in the collapsed context.

15. The computer program product of claim 13, wherein the operations further comprise representing an instance of the return value of the function in the collapsed context as a node in a data flow graph.

16. The computer program product of claim 15, wherein the operations further comprise:
determining that data of multiple tainted arguments can flow to the return value for the function when the function call is in the collapsed context; and
in response, bypassing adding an additional node to the data flow graph representing the return value for the function when the function call is in the collapsed context.

17. The computer program product of claim 13, wherein the operations further comprise analyzing data flow of each argument through the function at most once.

18. The computer program product of claim 13, wherein one or more arguments considered to be untainted for a particular function call are considered to be tainted when the function call is analyzed in the collapsed context.

* * * * *

UNITED STATES PATENT AND TRADEMARK OFFICE
CERTIFICATE OF CORRECTION

PATENT NO. : 9,823,912 B2
APPLICATION NO. : 14/884590
DATED : November 21, 2017
INVENTOR(S) : Alexander Spoon It is certified that error appears in the above-identified patent and that said Letters Patent is hereby corrected as shown below:

In the Claims

At Column 18, Line 13, in Claim 4, after "is" delete "analyzed"

At Column 19, Line 39, in Claim 8, after "context" insert --;--

At Column 21, Line 8, in Claim 14, after "context" insert --;--

Signed and Sealed this
Thirteenth Day of February, 2018

Andrei Iancu
*Director of the United States Patent and Trademark Office*